(12) United States Patent
Yadav et al.

(10) Patent No.: US 12,353,290 B2
(45) Date of Patent: Jul. 8, 2025

(54) APPLICATIONS AND FILE SYSTEM CLUSTER PROTECTION

(71) Applicant: Dell Products L.P., Round Rock, TX (US)

(72) Inventors: Sunil Yadav, Bangalore (IN); Shelesh Chopra, Bangalore (IN); Preeti Varma, Bangalore (IN)

(73) Assignee: Delll Products L.P., Round Rock, TX (US)

( * ) Notice: Subject to any disclaimer, the term of this patent is extended or adjusted under 35 U.S.C. 154(b) by 123 days.

(21) Appl. No.: 17/872,659

(22) Filed: Jul. 25, 2022

(65) Prior Publication Data

US 2024/0028463 A1 Jan. 25, 2024

(51) Int. Cl.
*G06F 11/14* (2006.01)
*G06F 21/62* (2013.01)

(52) U.S. Cl.
CPC ...... *G06F 11/1451* (2013.01); *G06F 11/1464* (2013.01); *G06F 21/6218* (2013.01)

(58) Field of Classification Search
CPC ............. G06F 11/1451; G06F 11/1464; G06F 21/6218
USPC ........................................................ 711/162
See application file for complete search history.

(56) References Cited

U.S. PATENT DOCUMENTS

| | | | |
|---|---|---|---|
| 7,549,037 B1 | 6/2009 | Kale | |
| 8,069,366 B1 | 11/2011 | Wenzel | |
| 8,225,057 B1 | 7/2012 | Zheng | |
| 8,473,463 B1 * | 6/2013 | Wilk | G06F 11/1453 707/649 |
| 8,595,454 B1 | 11/2013 | Nagarkar | |
| 8,990,162 B1 | 3/2015 | Kushwah | |
| 9,021,296 B1 | 4/2015 | Kiselev | |
| 9,077,580 B1 | 7/2015 | Randhawa et al. | |
| 9,268,784 B1 | 2/2016 | Guo et al. | |
| 9,398,092 B1 | 7/2016 | Singhal et al. | |
| 9,501,544 B1 * | 11/2016 | Singhal | G06F 11/14 |
| 9,535,907 B1 | 1/2017 | Stringham | |
| 9,934,107 B1 | 4/2018 | Chikkanayakanahally et al. | |
| 10,108,502 B1 | 10/2018 | Gopinath et al. | |
| 10,191,815 B2 | 1/2019 | Viswanathan | |
| 10,289,441 B1 | 5/2019 | Chopra et al. | |

(Continued)

OTHER PUBLICATIONS

PowerProtect Data Manager 19.9, Administration and User Guide, Dell EMC, Jan. 2022 rev. 02, (272 pages).

(Continued)

*Primary Examiner* — Reginald G Bragdon
*Assistant Examiner* — Sidney Li
(74) *Attorney, Agent, or Firm* — Chamberlain, Hrdlicka, White, Williams & Aughtry; Aly Z. Dossa

(57) ABSTRACT

One or more embodiments of the invention improves upon the traditional method of performing a backup, by having a data protection manager or similar component of the system, determine, when a backup is requested, which backup agent should initially perform the backup. That backup agent may then determine among the other applicable backup agents, which backup types are needed and the order each backup agent performs the backup, when more than one backup agent is appropriate. This will allow for a more efficient backup, while avoiding collisions between two or more backup agents trying to simultaneously back up the same data.

20 Claims, 4 Drawing Sheets

(56) References Cited

U.S. PATENT DOCUMENTS

| | | |
|---|---|---|
| 10,740,005 B1 | 8/2020 | Ives et al. |
| 10,853,189 B2 | 12/2020 | Bishop |
| 10,860,427 B1 | 12/2020 | Chakraborty |
| 10,936,545 B1 | 3/2021 | Chockalingam et al. |
| 11,048,591 B1 | 6/2021 | Mamidi |
| 2003/0163495 A1 | 8/2003 | Lanzatella |
| 2003/0221074 A1 | 11/2003 | Satoyama |
| 2008/0059721 A1 | 3/2008 | Turner et al. |
| 2009/0177856 A1 | 7/2009 | Herne |
| 2012/0117028 A1 | 5/2012 | Gold et al. |
| 2014/0229695 A1 | 8/2014 | Dinkar |
| 2014/0330785 A1 | 11/2014 | Isherwood |
| 2016/0034366 A1 | 2/2016 | Anglin |
| 2016/0048430 A1* | 2/2016 | Bolik ................. G06F 11/1456 711/162 |
| 2016/0203054 A1 | 7/2016 | Zhang |
| 2018/0300206 A1* | 10/2018 | Dai ......................... G06N 5/02 |
| 2018/0352032 A1 | 12/2018 | Liu et al. |
| 2019/0377643 A1 | 12/2019 | Zhang |
| 2020/0293193 A1* | 9/2020 | Littlefield ............. G06F 3/0641 |
| 2020/0351345 A1* | 11/2020 | Bansod ................ G06F 11/1451 |
| 2021/0034709 A1* | 2/2021 | Patwardhan ............ G06F 16/17 |
| 2021/0055996 A1 | 2/2021 | Owens et al. |
| 2021/0081287 A1 | 3/2021 | Koning et al. |
| 2021/0182156 A1 | 6/2021 | Sharma |
| 2021/0216412 A1 | 7/2021 | Navon |
| 2021/0349785 A1 | 11/2021 | Klus |
| 2022/0086221 A1 | 3/2022 | Mahto |

OTHER PUBLICATIONS

Dell PowerStore: Clustering and High Availability, White Paper, Dell Technologies, Jul. 2022 (45 pages).

* cited by examiner

APPLICATIONS AND FILE SYSTEM CLUSTER PROTECTION

BACKGROUND

In an enterprise environment, clustering is frequently used. One version of clustering, failover clustering, allows for a plurality of nodes to work together to increase the availability and scalability of the nodes. If a failure occurs in one or more of the nodes, other nodes are able to provide the services of the failed nodes with minimum disruptions to the end users of the node(s). To prevent loss of important data, performing backups and restorations of the assets located on the plurality of nodes or other related computing devices is necessary. However, in a clustering system that includes shared storage, performing a backup and/or restoration becomes increasingly complicated.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Figure 1:
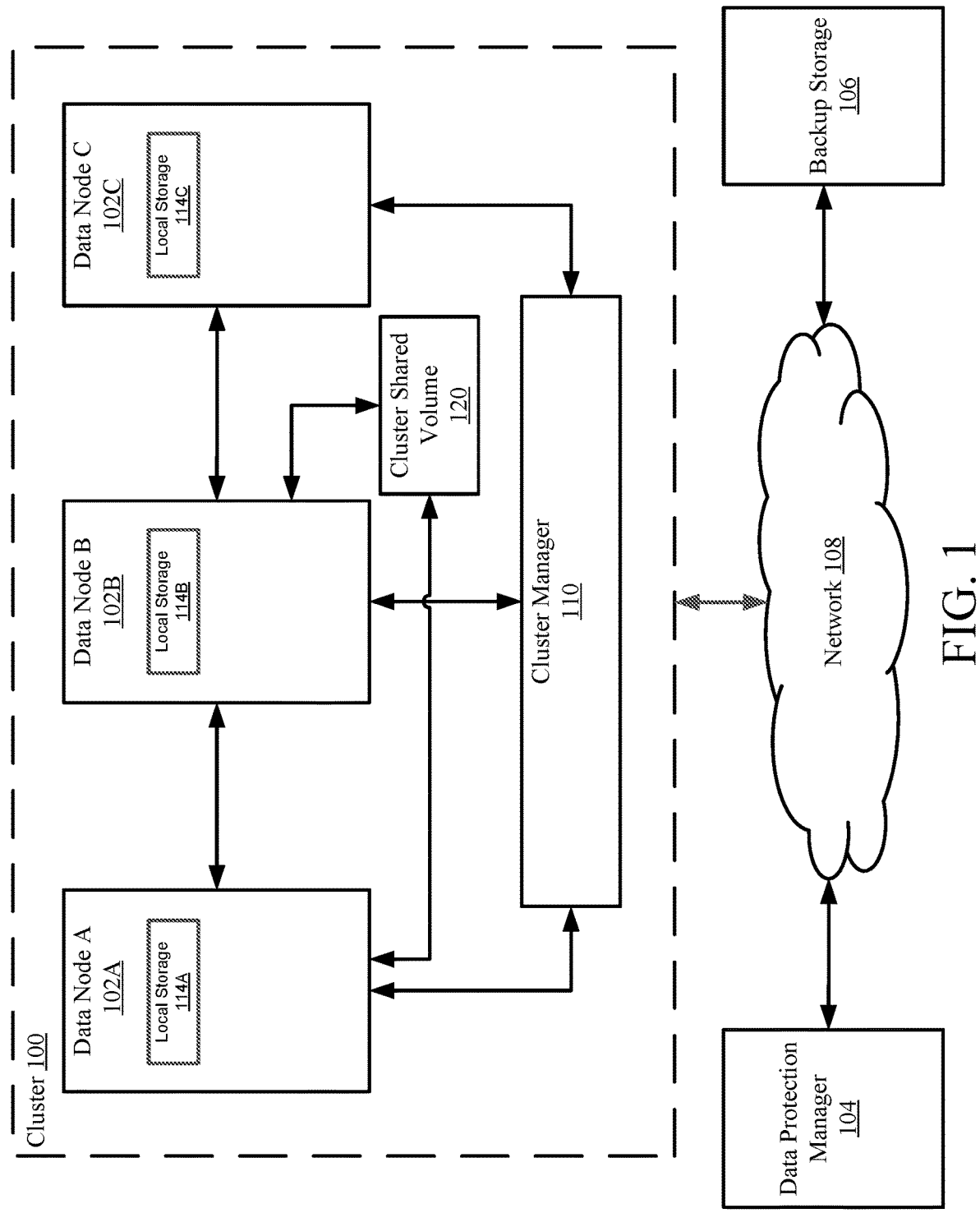
FIG. 1 shows a diagram of a cluster environment in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regards to any other figure. For brevity, descriptions of these components will not be repeated with regards to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of the figures may be labeled as A to C. As used herein, the aforementioned labeling means that the element may include any number of items and does not require that the element include the same number of elements as any other item labeled as A to C. For example, a data structure may include a first element labeled as A and a second element labeled as C. This labeling convention means that the data structure may include any number of the elements. A second data structure, also labeled as A to C, may also include any number of elements. The number of elements of the first data structure and the number of elements of the second data structure may be the same or different.

In general, embodiments of the invention relate to a system and method for managing data clusters. More specifically, embodiments of the invention relate to a method of performing a backup of an asset which is associated with a shared volume and more than one backup agent.

When a backup is triggered for an asset associated with a shared volume, more than one data node (also referred to as a node(s)) and more than one backup agent may be able to perform the backup. Currently, there is the potential for all of the backup agents to try and perform a backup on the same asset/data (or on overlapping sets of assets). This may cause a collision between two or more backup agents trying to simultaneously back up the same data. Alternatively, a user or administrator has to manually configure the various backup agents in order to sufficiently stagger their individual backups, so as to avoid a collision. There is currently no intelligence for determining which agent is the best backup agent for backing up a particular type of asset.

One or more embodiments of the invention improves upon the traditional method of performing a backup, by having a data protection manager or similar component of the system, determine, which backup agent should initially perform the backup. That backup agent may then determine among the other applicable backup agents, which backup types are needed and the order each backup agent performs the backup, when more than one backup agent is appropriate. This will allow for a more efficient backup, while avoiding collisions between two or more backup agents trying to simultaneously back up the same data.

FIG. 1 shows a diagram of a system in accordance with one or more embodiments of the invention. The system may include a data protection manager (104), backup storage (106), and at least one data cluster (100). The system may include any number of data clusters (e.g., 100) without departing from the invention. For example, the system may include two data clusters (not shown) that communicate through the network (108). The system may include additional, fewer, and/or other components without departing from the invention. Each of the components in the system may be operatively connected via any combination of wireless and/or wired networks (108).

In one or more embodiments of the invention, the data cluster (100) may include a plurality of nodes (e.g., 102A-102C), a cluster manager (110), and at least one cluster shared volume(s) (120). The system may include any number of data nodes (e.g., 102A-102C) without departing from the invention. For example, the system may include two data nodes (102A) and (102B) that communicate through an internal network or by other means. The system may include additional, fewer, and/or other components without departing from the invention. Each of the components of the data cluster may be operatively connected via any combination of wireless and/or wired networks (108).

In one or more embodiments of the invention, the data protection manager (104) includes the functionality to provide data protection services to the data cluster (100). The data protection manager (104) may include the functionality to provide and/or obtain additional services without departing from the invention. While FIG. 1 shows the data protection manager (104) as a separate component, it may be a part of the cluster manager (110) or located in one or more of the data nodes (e.g., 102A-102C).

To perform the aforementioned data protection services, the data protection manager (104) may include various modules such as a mapping module (not shown). The data protection manager (104) may also include persistent storage (not shown), or it may store data on one or more of the local storage devices (114A-114C) that are associated with the data nodes (e.g., 102A-102C). Alternatively, the data protection manager (104) may store data on the cluster shared volumes (CSV, e.g., 120). The data protection manager (104) may include other and/or additional components, without departing from the invention. Each of the aforementioned components of the data protection manager is discussed below.

In one or more embodiments of the invention, the data protection manager (104) initiates data protection events such as discovery, backup, and restoration. The data protection manager (104) communicates with the cluster (100) so that the cluster manager (110) or an appropriate data node (e.g., 102A-102C) may carry out the data protection event. The data protection manager (104) in one or more embodiments of the invention receives requests for performing data protection events including backups and restorations of selected asset. The data protection manager (104) coordinates and communicates with one or more data nodes (e.g., 102A-102C) to select a data node (e.g., 102A-102C) and have the data node perform the data protection event, as is described in more detail below with regards to the methods shown in FIGS. 2A and 2B.

In one or more embodiments of the invention, the data protection manager (104) may include a user interface that allows a user or administrator to configure or change a data protection event. This may include displaying a graphical user interface (GUI) that presents options, including rankings of the available data nodes (e.g., 102A-102C) to a user or administrator that they may select from, such as a preferred data node to perform the data protection event, or indications of which assets/applications/files/folders a user or administrator wants to have protected.

In one or more embodiments of the invention, the data protection manager (104) may determine a preferred data node (e.g., 102A-102C) for performing data protection such as a backup or restoration on a given asset. The asset may be a specific application and its data, file system, host, client, and/or an entire volume. The determination of the preferred data node may be done during periodic discovery, after receiving a request for a data protection event (such as those discussed in more detail below with regards to the methods shown in FIGS. 2A and 2B), or at any other configured time as configured by a user, administrator, or system designer/manufacturer.

In one or more embodiments of the invention, the data protection manager (104) may initiate and choose the specific backup agents for performing a backup. The backup agents (not shown) execute on the data nodes. In accordance with one or more embodiments, the backup may be performed as described in the method shown in FIGS. 2A and 2B). In one or more embodiments of the invention, the data protection manager (104) may determine which backup agent or backup agents should perform the backup of a selected asset, when more than one backup agent is present in a preferred node or associated with the specific asset. For example, a database asset, may be backed up by both a file system (FS) backup agent and the database's backup agent. In accordance with one or more embodiments of the invention, the data protection manager (104) selects the FS backup agent to manage the backup of the database at least initially. The specific method of choosing which backup agent to use is described in more detail below with regards to the method shown in FIG. 2B. Other methods for determining which backup agent to use for performing the backup may be used without departing from the invention.

Figure 3:
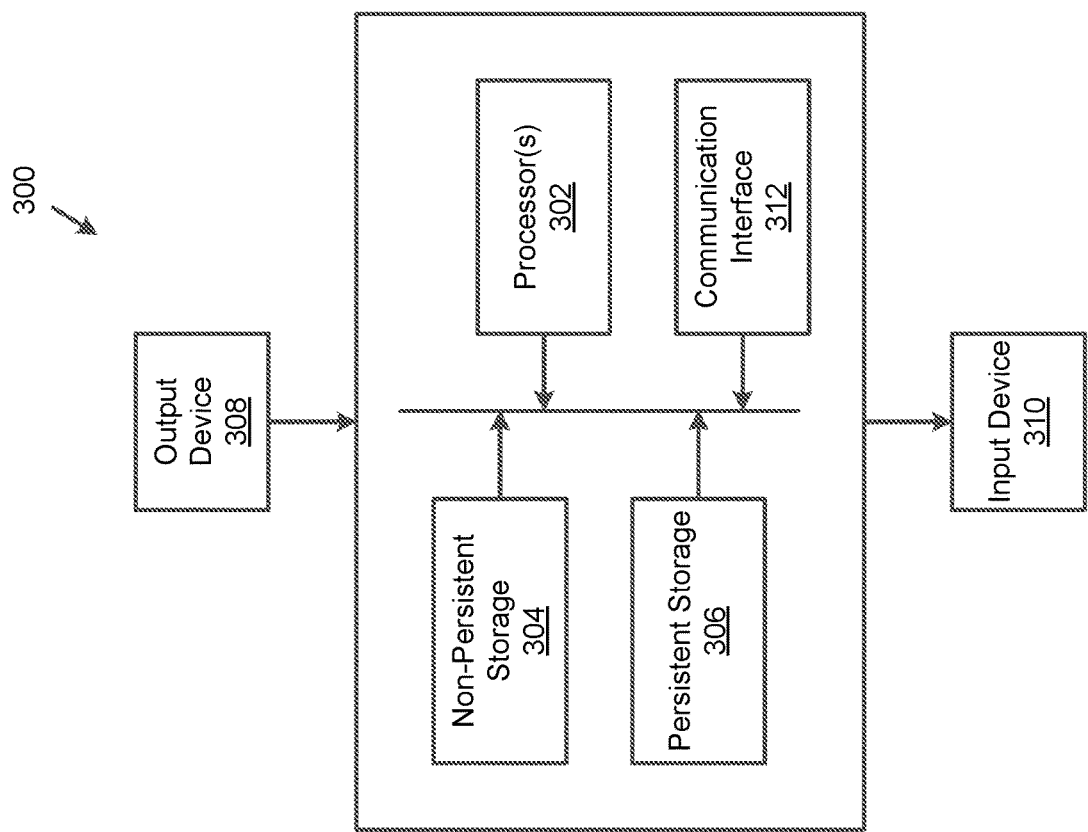
FIG. 3 shows a diagram of a computing device in accordance with one or more embodiments of the invention.

In one or more embodiments of the invention, the data protection manager (104) is implemented as a computing device (see e.g., FIG. 3). The computing device may be, for example, a mobile phone, tablet computer, laptop computer, desktop computer, server, distributed computing system, or cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the data protection manager (104) described throughout this application.

In one or more embodiments of the invention, the data protection manager (104) is implemented as a logical device. The logical device may utilize the computing resources of any number of computing devices and thereby provide the functionality of the data protection manager (104) described throughout this application.

In one or more embodiments of the invention, the data protection manager (104) works with backup storage (106) to store backups and mapping information. Backup storage may comprise of local storage/volumes that are stored in any of the local storage devices (e.g., 114A-114C) or the cluster shared volumes (120). In one or more embodiments of the invention, the backup storage (106) may comprise of storage that is not part of the cluster (100). Backup storage (106) may also comprise of off-site storage including but not limited to, cloud base storage, and long-term storage such as tape drives, depending on the particular needs of the user and/or the system. The backup storage (106) may include one or more processors, memory (e.g., random access memory), and persistent storage (e.g., disk drives, solid state drives, etc.).

In one or more embodiments of the invention, the backup storage (106) includes the functionality to provide backup storage services to the data nodes (e.g., 102A-102C) as discussed above. The backup storage services may include (i) obtaining backups of data generated through the performance of computer implemented services from the data nodes (e.g., 102A-102C), (ii) storing data and metadata associated with the backups in persistent storage of the backup storage (106), and (iii) providing backups to the data nodes (e.g., 102A-102C) for restoration purposes and/or other purposes without departing from the invention. The backup storage services may include the functionality to provide and/or obtain additional services without departing from the invention. The backup storage (106) may include any number of backup storages without departing from the invention.

In one or more embodiments of the invention, the backup storage (106) is implemented as a computing device (see e.g., FIG. 3). A computing device may be, for example, a mobile phone, tablet computer, laptop computer, desktop computer, server, distributed computing system, or cloud resource. The computing device may include one or more processors, memory (e.g., random access memory), and persistent storage (e.g., disk drives, solid state drives, etc.).

The computing device may include instructions stored on the persistent storage, that when executed by the processor(s) of the computing device it causes the computing device to perform the functionality of a backup storage (106) as described throughout this application.

In one or more embodiments of the invention, the backup storage (106) is implemented as a logical device. The logical device may utilize the computing resources of any number of computing devices and thereby provide the functionality of the backup storage (106) as described throughout this application.

In one or more embodiments of the invention, the data protection manager (104) and backup storage (106), communicate with the cluster (100) through a network (108). The network (108) may take any form of network including any combination of wireless and/or wired networks. The network (108) may be a local network (LAN) or a wide area network (WLAN) including the Internet or a private enterprise network that connects more than one location. The network (108) may be any combination of the above networks, other known network, or any combination of network types.

In one or more embodiments of the invention, the network (108) allows the cluster (100) to communicate with other clusters (not shown) and external computing devices such as (but not limited to) a data protection manager (e.g., 104) and backup storage (e.g., 106). The various components of the cluster (100) may also communicate with each other through a network. The network may be a high-speed internal network and/or include part of an external network (108). The data nodes (e.g., 102A-102C), cluster share volume (e.g., 120) and cluster manager (e.g., 110) communicate with each other over the internal network and in one or more embodiments of the invention provide fallback functionality.

A network (e.g., network (108)) may refer to an entire network or any portion thereof (e.g., a logical portion of the devices within a topology of devices). A network may include a data center network, wide area network, local area network, wireless network, cellular phone network, and/or any other suitable network that facilitates the exchange of information from one part of the network to another. A network may be located at a single physical location or be distributed at any number of physical sites. In one or more embodiments, a network may be coupled with, or overlap, at least in part, with the Internet.

In one or more embodiments, although shown separately in FIG. 1, the network (108) may include any number of devices within any components (e.g., 100, 104, and 106) of the system, as well as devices external to, or between, such components of the system. In one or more embodiments, at least a portion of such devices are network devices (not shown). In one or more embodiments, a network device is a device that includes and/or is operatively connected to persistent storage (not shown), memory (e.g., random access memory (RAM)) (not shown), one or more processor(s) (e.g., integrated circuits) (not shown), and at least two physical network interfaces, which may provide connections (i.e., links) to other devices (e.g., computing devices, other network devices, etc.). In one or more embodiments, a network device also includes any number of additional components (not shown), such as, for example, network chips, field programmable gate arrays (FPGAs), application specific integrated circuits (ASICs), indicator lights (not shown), fans (not shown), etc. A network device may include any other components without departing from the invention. Examples of a network device include, but are not limited to, a network switch, router, multilayer switch, fibre channel device, an InfiniBand® device, etc. A network device is not limited to the aforementioned specific examples.

Figure 2A:
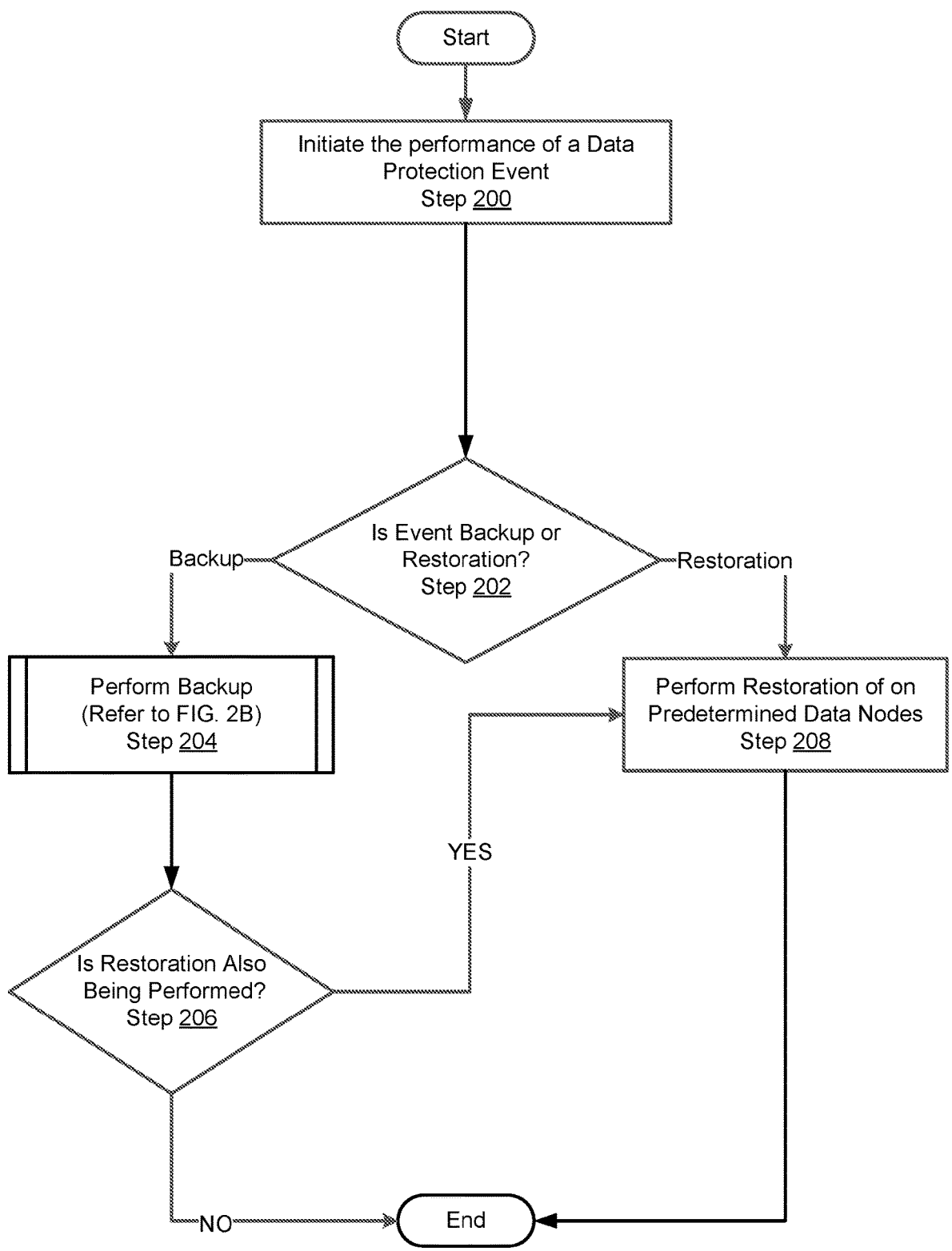
FIG. 2A shows a flowchart of a method for performing a data protection event such as a backup and/or restoration in accordance with one or more embodiments of the invention.
Figure 2B:
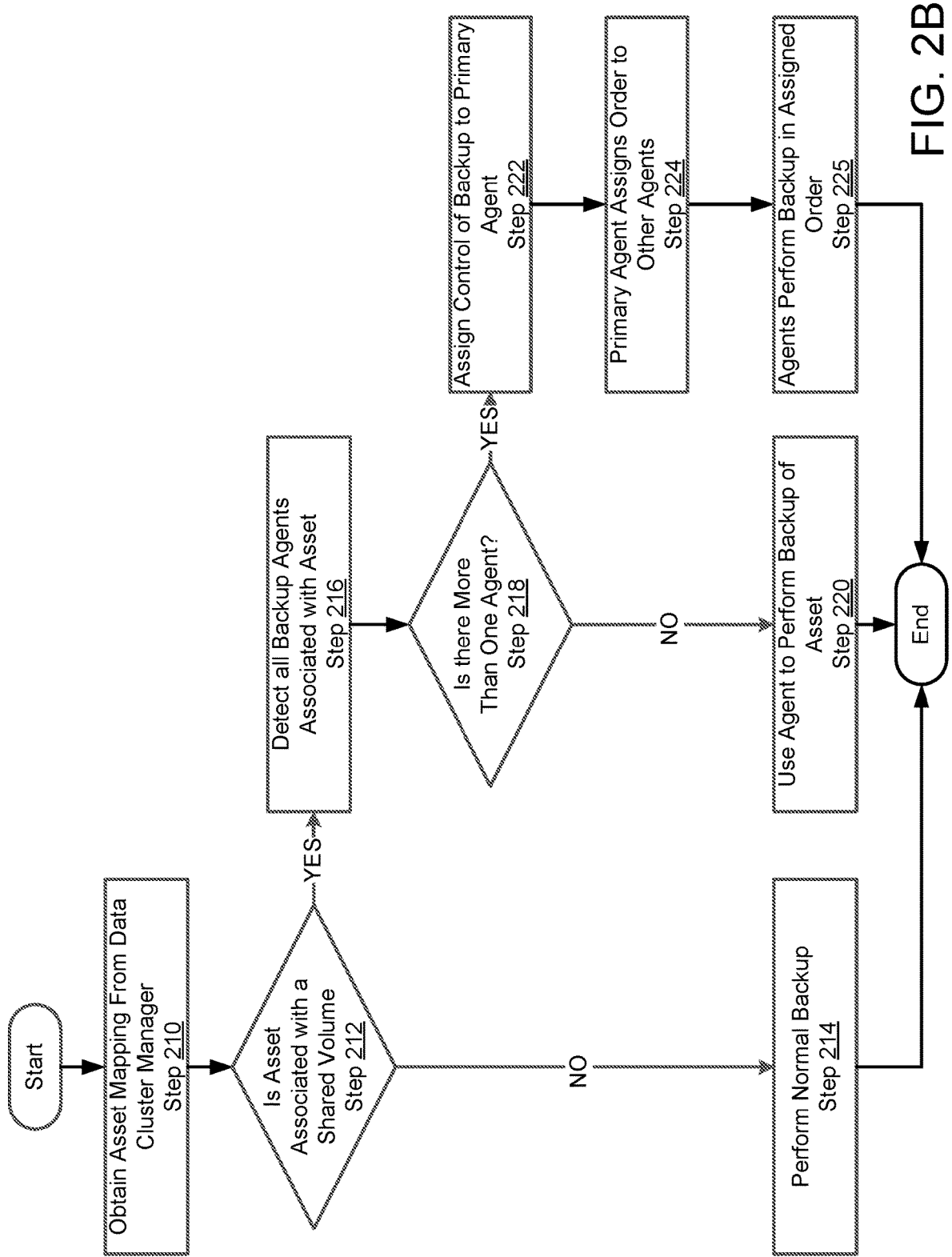
FIG. 2B shows a flowchart of a method for performing a backup with a selected backup agent in accordance with one or more embodiments of the invention.

In one or more embodiments, network devices are configured to participate in one or more network protocols, which may include discovery schemes and data protection events such as the methods described in FIGS. 2A and 2B. Discovery schemes are a way to discover, prior to performing a data protection event, information about all or any of the network topology in which the network device exists. Such discovery schemes may include sharing of information between network devices and may also include providing information to other devices within the system, such as, for example, data nodes (e.g., 102A-102C), backup storage (e.g., 106) and/or shared storages (e.g., 110).

In one or more embodiments of the invention, a data cluster (e.g., 100) may be implemented as one or more computing devices. A data cluster (e.g., (100)) may include any number of computing devices without departing from the invention. The data cluster may include different numbers of computing devices, different quantity, and types of computer resources, and may perform different computer implemented services without departing from the invention.

In one or more embodiments of the invention, the data cluster (100) includes a plurality of data nodes (e.g., 102A-102C) which include the functionality to obtain data protection services from the data protection manager (e.g., 104) and/or the cluster manager (e.g., 110). While shown as including only three data nodes (e.g., 102A-102C), the data cluster (100) may include more or less data nodes without departing from the invention, for example a cluster (e.g., 100) could comprise of at least sixteen data nodes, fifty data nodes, or a hundred data nodes without departing from the invention. The cluster may also include shared storage including at least one CSV (e.g., 120) which is active with each of the data nodes (e.g., 102A-102C) of the data cluster (100). Other types of shared storage may also or alternatively be included such as active-passive storage and local storage (e.g., 114A-114C).

In one or more embodiments of the invention, the data nodes (e.g., 102A-102C) perform workloads and provide services to clients and/or other entities not shown in the system illustrated in FIG. 1. The data nodes (e.g., 102A-102C) may further include the functionality to perform computer implemented services for users (e.g., clients, not shown) of the data cluster (100). The computer implemented services may include, for example, database services, electronic mail services, data processing services, etc. The computer implemented services may include other and/or additional types of services without departing from the invention.

During the performance of the aforementioned services, data may be generated and/or otherwise obtained. The data nodes (e.g., 102A-102C) include local storage (e.g., 114A-114C) which may include multiple volumes, as well as shared storage which may include cluster shared volumes (CSVs e.g., 120). The various data storage volumes (e.g., 114A-114C as well as CSV 120) performing data storage services may include storing, modifying, obtaining, and/or deleting data stored on the shared storages (e.g., 120). The data storage services may include other and/or additional services without departing from the invention. The data generated and stored on the shared storages (e.g., 114A-114C as well as CSV 120) by the data nodes (e.g., 102A-102C) may be valuable to users of the system, and therefore may be protected. The data nodes (e.g., 102A-102C) may obtain backup storage services from the backup storage (106). Alternatively, the data nodes (e.g., 102A-102C) may provide backup storage services themselves and include backup storage on the local storage (e.g., 114A-114C) or the cluster shared volumes (e.g., 120). The backup storage services may include storing backups of data stored on the shared storages for restoration purposes. The backup storage services may include other and/or additional services without departing from the invention.

The data nodes (e.g., 102A-102C) may include the functionality to perform data protection services for data stored in the various data storage volumes (e.g., 114A-114C as well as CSV 120). The data protection services may include generating backups of data stored in the shared storages (110) and storing the backups in the backup storage (106). The data nodes (e.g., 102A-102C) may include the functionality to perform other and/or additional services without departing from the invention.

The data nodes (e.g., 102A-102C) may include a primary data node (e.g., 102A) and secondary data nodes (e.g., 102B and 102C). The specific configuration of which data node is the primary data node and which data node is the secondary data node may be preconfigured or may be automatically managed by the cluster manager (e.g., 110). The data nodes (e.g., 102A-102C) may include any number of secondary data nodes without departing from the invention. Alternatively, all data nodes (e.g., 102A-102C) may be secondary data nodes with the cluster manager (e.g., 110) performing the additional tasks of the primary node.

The data nodes (e.g., 102A-102C), may be operably connected to one or more cluster shared storages (e.g., 120) and may obtain data storage services from the one or more cluster shared storages (e.g., 120). The data nodes (e.g., 102A-102C) may be operably connected to each other, and each data node (e.g., 102A) may include the ability to use all or part of the volumes, including shared active-passive drives that form the local storage (e.g., 114A-114C) of the other data nodes (e.g., 102B and 102C).

In one or more embodiments of the invention, the data nodes (e.g., 102A-102C) are implemented as computing devices (see e.g., FIG. 3). A computing device may be, for example, a mobile phone, tablet computer, laptop computer, desktop computer, server, distributed computing system, or cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the data nodes (e.g., 102A-102C) described throughout this application.

In one or more embodiments of the invention, the data nodes (e.g., 102A-102C) are implemented as a logical device. The logical device may utilize the computing resources of any number of computing devices and thereby provide the functionality of the data nodes (e.g., 102A-102C) described throughout this application.

In one or more embodiments of the invention, the data nodes (e.g., 102A-102C) include storage that includes local storage (e.g., 114A-114C) that is associated with only their assigned data node. The storage also includes shared storage such as a cluster shared volume (CSV e.g., 120). The storage may also include other types of shared volumes including active-passive shared volumes which only provide data storage services to the data nodes they are active on.

The data nodes (e.g., 102A-102C) as well as other components of the cluster and connected devices may perform data storage services. The data storage services may include storing, modifying, obtaining, and/or deleting data stored on the local and shared storages (e.g., 114A-114C and 120) based on instructions and/or data obtained from the data nodes (e.g., 102A-102C) or other components of the cluster (e.g., 100). The data storage services may include other and/or additional services without departing from the invention. The local and shared storages (e.g., 114A-114C and 120) may include any number of storage volumes without departing from the invention.

The local and shared storages (e.g., 114A-114C and 120) may include storage devices (not shown) for storing data. The storage devices may be physical storage devices and/or logical storage devices. The physical storage devices may include any combination of hard disk drives, solid state disk drives, tape drives, and/or any other physical storage mediums for the storage of data.

The logical storage devices (e.g., virtualized storage) may utilize any quantity of hardware storage resources of any number of computing devices for storing data. For example, the local and shared storages (e.g., 114A-114C and 120) may utilize portions of any combination of hard disk drives, solid state disk drives, tape drives, and/or any other physical storage medium of any number of computing devices.

In one or more embodiments of the invention, the local and shared storages (e.g., 114A-114C and 120) are implemented as computing devices (see e.g., FIG. 3). A computing device may be, for example, a mobile phone, tablet computer, laptop computer, desktop computer, server, distributed computing system, or cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the local and shared storages (e.g., 114A-114C and 120) described throughout this application.

In one or more embodiments of the invention, the data nodes (e.g., 102A-102C) as well as the associated local and shared storages (e.g., 114A-114C and 120) are managed by a cluster manager (e.g., 110). The cluster manager (110) performs a plurality of functions not limited to managing and configuring the services provided by the data nodes (e.g., 102A-102C), managing the mapping and movement of data on at least the shared volumes including any cluster shared volumes (e.g., 120). The cluster manager (110) may perform other functions attributed to other components of the system or function not described herein without departing from the invention.

In one or more embodiments of the invention the cluster manager (110) includes the functionality to perform a portion, or all of, the data protection services of the data protection manager (104). This may include performing discovery of the volumes and assets associated with the data nodes (e.g., 102A-102C) including those stored on the local storage (e.g., 114A-114C) and the CSV (e.g., 120). This may also include performing, initiating backups and restorations, as well as determining a preferred data node including some or all of the functions described above as being ascribed to a data protection manager (e.g., 104), as well as the functions and method described in the method shown in FIGS. 2A and 2B described below. The cluster manager (110) may include the functionality to perform and or obtain other and/or additional services without departing from the invention.

In one or more embodiments of the invention, the cluster manager (110) may perform discovery on the volumes and assets of the volumes and assets associated with the data nodes (e.g., 102A-102C) including those stored on the local storage (e.g., 114A-114C) and the CSV (e.g., 120). The cluster manager queries each data node (e.g., 102A-102C) and their associated local and shared storage (e.g., 114A-114C and 120). Using the results of the query, the cluster manager (110) produces an asset mapping, which is stored on each of the data nodes (e.g., 102A-102C). This allows for each of the data nodes (e.g., 102A-102C) to know where a given asset is located at any given time. By updating the discovery periodically, such as, but not limited by, every fifteen seconds, the asset mapping may remain accurate and provide quicker access times with less or no inter-node messaging. Further if one data node fails, the location of at least the shared assets is not lost.

In one or more embodiments of the invention, discovery determines whether an asset, such as an application and its data, a folder, a file or other selected asset is stored on local storage (e.g., 114A-114C) of the data nodes (e.g., 102A-102C) or if it is stored on a shared volume such as a CSV (e.g., 120). In accordance with one or more embodiments of the invention the shared volume may be a CSV (e.g., 120), an active-passive shared volume, or other form of shared storage. If an asset such as an application and/or its data is located on a shared volume, then the asset is mapped to a cluster client, otherwise the asset is mapped to the data node (e.g., 114A-114C) that at least its data is associated with.

The asset mapping may include additional information from that described herein. The asset mapping may also include information about the location of specific applications and their data on the mapped volumes. The asset mapping may also include such information as dependency information, data types (e.g., image data, file data, database data, etc.), and data change rates (i.e., the amount of data change per unit of time). The asset mapping may also include information with regards to the location of hosts and/or virtual clients. The asset mapping may also include mapping of various backups that have previously been formed from the selected assets. The asset mapping may include other and/or additional types of information without departing from the invention.

The asset mapping, once produced by the cluster manager (e.g., 110, FIG. 1), is stored on each of the data nodes (e.g., 102A-102C, FIG. 1). This allows each of the data nodes (e.g., 102A-102C, FIG. 1) to know where a given asset and/or a given backup is located at any given time. By updating the discovery periodically, such as, but not limited by, every fifteen seconds, and updating the mapping of the backups anytime a backup is performed, the asset mapping may remain accurate and provide quicker access times with less inter-node messaging. Further if one data node fails, the location of at least the shared asset or backup is not lost.

In one or more embodiments of the invention, the cluster manager (110) may in addition to, or instead of the data protection manager (e.g., 104), determine the preferred data node for performing the data protection such as a backup on a given asset such as a specific application and its data and/or an entire volume. This may be done during the periodic discovery described above, or as a result of a data protection event as shown in FIGS. 2A and 2B, or at any other configured time as configured by a user, administrator, or system designer/manufacturer.

In one or more embodiments of the invention, the cluster manager (e.g., 110, FIG. 1) is a physical device. The physical device may include circuitry. The physical device may be, for example, a field-programmable gate array, application specific integrated circuit, programmable processor, microcontroller, digital signal processor, or other hardware processor. The physical device may be adapted to provide the functionality of the cluster manager (e.g., 110, FIG. 1) described throughout this application.

In one or more embodiments of the invention, the cluster manager (e.g., 110, FIG. 1) is implemented as computer instructions, e.g., computer code, stored on a persistent storage that when executed by a processor of the cluster (e.g., 100, FIG. 1) including any-one-of the data nodes (e.g., 102A-102C, FIG. 1) to provide the functionality of the cluster manager (e.g., 110, FIG. 1) described throughout this application.

In one or more embodiments of the invention, the cluster manager (e.g., 110, FIG. 1) is implemented as a computing device (see e.g., FIG. 3). A computing device may be, for example, a mobile phone, tablet computer, laptop computer, desktop computer, server, distributed computing system, or cloud resource. The computing device may include one or more processors, memory (e.g., random access memory), and persistent storage (e.g., disk drives, solid state drives, etc.). The computing device may include instructions stored on the persistent storage, that when executed by the processor(s) of the computing device cause the computing device to perform the functionality of a cluster manager (e.g., 110, FIG. 1) described throughout this application.

In one or more embodiments of the invention, the cluster manager (e.g., 110, FIG. 1) is implemented as a logical device. The logical device may utilize the computing resources of any number of computing devices and thereby provide the functionality of the backup storage (e.g., 106, FIG. 1) described throughout this application.

In one or more other embodiments of the invention, one or more of the functions of the cluster manager (e.g., 110, FIG. 1) may be performed by a data protection manager (e.g., 104, FIG. 1), a backup storage (e.g., 106, FIG. 1), the individual data nodes (e.g., 102A-102C, FIG. 1), or other component of the system without departing from the invention.

FIG. 2A shows a flowchart of a method for performing a protection event. The method may be performed by, for example, a data protection manager (e.g., 104, FIG. 1) a cluster manager (e.g., 110, FIG. 1), and/or a data node (e.g., 102A-102C, FIG. 1). Other components of the system illustrated in FIG. 1 may perform all, or a portion, of the method of FIG. 2A without departing from the invention.

While FIG. 2A is illustrated as a series of steps, any of the steps may be omitted, performed in a different order, additional steps may be included, and/or any or all of the steps may be performed in a parallel and/or partially overlapping manner without departing from the invention.

In step 200, a data protection event is initialized. In one or more embodiments of the invention this may be initialized based on an automatic policy or by a user/administrator's request. In accordance with one or more other embodiments of the invention the data protection event may initialized automatically when one or more data nodes have a failover event. Other means for initializing a protection event discovery event associated with a data cluster may be used without departing from the invention.

During the initialization of the data protection event, a user, administrator, or a component of the system such as the data protection manager (e.g., 104, FIG. 1) determines which assets are to be protected by the data protection event. The selected assets may be one or more selected applications (including the file system itself) that are associated with one or more data nodes (e.g., 102A-102C, FIG. 1). Alternatively, the selected assets may be one or more volumes (e.g., 114A-114C and 120, FIG. 1) associated with the data nodes (e.g., 102A-102C, FIG. 1) or any combination of applications and volumes. Other aspects of the system may be selected for backup without departing from the invention.

If not previously performed or needing updating, once the data protection event is initialized, discovery is performed. In accordance with one or more embodiments of the invention, discovery is performed at least prior to the performance of one or more data protection events. Discovery, in accordance with one or more embodiments of the invention, may also, or alternatively, be performed periodically such as every five minutes or other predetermined period of time, and may be performed prior or outside of the method of FIG. 2A. In accordance with one or more embodiments of the invention, discovery may be performed at any time including during step 200 prior to the initialization of a data protection event. In one or more embodiments of the invention discovery may be performed at any time, that the data protection policies and/or user/administrator preferences configured the discovery to take place.

Discovery may map all of the assets of a cluster (e.g., 100, FIG. 1) or subset of the assets such as at least the selected assets. The mapping may be stored in each of the data nodes (e.g., 102A-102C, FIG. 1), the CSV (e.g., 120, FIG. 1), cluster manager (e.g., 110, FIG. 1), the data protection manager (e.g., 104, FIG. 1), backup storage (e.g., 106, FIG. 1) or other predetermined component/storage of the cluster (e.g., 100, FIG. 1) and related systems.

Once the data protection event is initialized in step 200, in accordance with one or more embodiments of the invention, the method proceeds to step 202. In step 202 a determination is made if the protection event is a backup and/or a restoration of the selected assets. If the event includes a backup the method proceeds to step 204, alternatively if the event only includes a restoration of selected assets, the method proceeds to step 208.

While step 202 only describes determining between backup and restoration events, other data protection events may follow similar steps to either the backup or restoration steps as appropriate without departing form the invention. Such other events may include snapshots, archiving, migrating, and other data protection events.

In step 204, in accordance with one or more embodiments of the invention, a backup is performed for selected assets. The backup is performed by at least one data node (e.g., 102A) that is associated with the selected assets. In at least one embodiments of the invention the initial backup is performed in accordance with the method shown in FIG. 2B and explained below. Other method may be used alternatively, or in addition to the method described with regards to FIG. 2B.

Once the backup in step 204 is performed, the method proceeds to step 206. In step 206, in accordance with one or more embodiments of the invention, it may be determined if the protection policy event also includes performing a restoration. If a restoration is also to be performed the method proceeds to step 208. If a restoration is not to be performed, in one or more embodiments of the invention the method ends following step 206.

If the data protection event is determined in step 202 or 206 to also, or alternatively, include performing a restoration, the method proceeds to step 208. In step 208 a restoration is performed using a preferred data node using asset mapping obtained during discovery. The restoration may use the same data node (e.g., 102A-102C) that was used to perform the backup of step 204. Alternatively, any other data node (e.g., 102A-102C) may perform the restoration as determined by a data protection policy and/or a user/administrator's selection without departing from the invention.

In one or more embodiments of the invention, the method ends following step 206 or as described above after step 208 if a restoration is not to be performed.

FIG. 2B shows a flowchart of a method for performing a backup (e.g., step 204 of FIG. 2A) in accordance with one or more embodiments of the invention. The method may be performed by a data node (e.g., 102A-102C, FIG. 1), a cluster manager (e.g., 110, FIG. 1) or a combination thereof. Other components of the system illustrated in FIG. 1 may perform all, or a portion, of the method of FIG. 2A without departing from the invention.

While FIG. 2B is illustrated as a series of steps, any of the steps may be omitted, performed in a different order, additional steps may be included, and/or any or all of the steps may be performed in a parallel and/or partially overlapping manner without departing from the invention.

In step 210, in accordance with one or more embodiments of the invention, asset mapping is obtained. In one or more embodiments of the invention the asset mapping is performed during discovery and may be obtained from any of the data nodes (e.g., 102A-102C, FIG. 1). Alternatively, the asset mapping may be obtained from the cluster manager (e.g., 110), the data protection manager (e.g., 104) or from any other source that maintains an updated asset mapping. If discovery has not been performed within a set amount of time, in one or more embodiments of the invention it may be performed in step 210.

The asset mapping obtained in step 210, in accordance with one or more embodiments of the invention includes a mapping between a selected asset such as an application and its data and the data nodes and/or storage volumes that the asset is associated with. Based on this asset mapping obtained in 210, the method proceeds to step 212, where it is determined if the asset is associated with a shared volume. The shared volume in accordance with one or more embodiments of the invention, may be a CSV (e.g., 120, FIG. 1), an active-passive volume, and/or other volume or drive that is associated with more than one data node (e.g., 102A-102C, FIG. 1).

As described above, the asset, in one or more embodiments of the invention, may take the form of an application and its related data. In one or more embodiments of the invention, the asset may include such applications as a database application including a Structure Query Language (SQL) based database application and/or an email application such as Exchange. The application may also, or in addition, be a file system (FS). These applications, often include data; the data may be stored with or separately from the application.

In step 210 where the asset is an application and its data; if the application and its data is not stored or associated with a shared volume, the method proceeds to step 214, where normal backup is performed on the asset. This may be performed by the application's own backup or archiving agent(s), by the file system's backup and/or archiving agent(s), or by other backup agents. Once the normal backup is performed in step 214, the method ends.

Alternatively, if in step 212, it is determined that the asset is associated with a shared volume, the method proceeds to step 216. If the asset comprises of an application and its data, only the application or only the data must be associated with the shared volume. For example, if database application is only associated with one data node (e.g., 102A-102C, FIG. 1), but stores its data on a shared volume (e.g., 120, FIG. 1), then the method would proceed from step 212 to step 216.

If both the application and data are associated with shared volume (e.g., 120, FIG. 1) the method also proceeds to step 216.

In step 216, all the backup agents associated with the selected asset are detected and in 218 the method determines if there is more than one backup agent associated with the asset or alternatively if there is more than one backup agent on the data node. If the method determines only one backup agent is associated with the asset (for example a files system backup agent) or present on the data node, then the method proceeds to step 220, and that backup agent performs the backup, and the method ends. If, however, there is more than one backup agents associated with the selected asset (for example for the email application, both a file system's backup agent and email application's backup/archiving agent may be associated with the asset), the method proceeds to step 222.

In step 222, the data protection manager (e.g., 104, FIG. 1) or other appropriate components such as the cluster manager (e.g., 110, FIG. 1) assign one of the backup agents as the primary agent. In one or more embodiments of the invention the file system backup agent is assigned as the primary agent. However, other backup agents or related agents may be assigned control depending on the specific selected asset or application as well as other considerations including data node (e.g., 102A-102C, FIG. 1) load and capabilities.

Once the primary agent is selected, the primary agent determines the order the other agents may perform backups on the same asset in step 224. This may also include a period of time that is to separate the performance of the backups by the different agents. For example, if a file system agent is made the primary agent, it may determine that two hours need to pass between it performing a backup of the asset and the database agent performing a backup of the asset. While the example suggests that the primary agent performs the backup first, the order of the backup is specific to the selected assets and backup agents. For example, it may be more beneficial for the email application to perform archiving prior to the file system performing a backup of the email application. Other periods of time and orders of the backup agents may be used in accordance with one or more embodiments of the invention, and the specific separation as well as backup agent is exemplary only. In another example, the order may the set such that none of the backup agents operate concurrently. Said another way, the backup agents operation such that their operations do not overlap.

Once the order of the agents as well as other factors such as time between backups is determined in step 224, in accordance with one or more embodiments of the invention, the method proceeds to step 225. In step 225, the agent performs the backup in the order determined in step 224, and the method ends.

As discussed above, embodiments of the invention may be implemented using computing devices. FIG. 3 shows a diagram of a computing device in accordance with one or more embodiments of the invention. The computing device (300) may include one or more computer processors (302), non-persistent storage (304) (e.g., volatile memory, such as random access memory (RAM), cache memory), persistent storage (306) (e.g., a hard disk, an optical drive such as a compact disk (CD) drive or digital versatile disk (DVD) drive, a flash memory, etc.), a communication interface (312) (e.g., Bluetooth® interface, infrared interface, network interface, optical interface, etc.), input devices (310), output devices (308), and numerous other elements (not shown) and functionalities. Each of these components is described below.

In one embodiment of the invention, the computer processor(s) (302) may be an integrated circuit for processing instructions. For example, the computer processor(s) (302) may be one or more cores or micro-cores of a processor. The computing device (300) may also include one or more input devices (310), such as a touchscreen, keyboard, mouse, microphone, touchpad, electronic pen, or any other type of input device. Further, the communication interface (312) may include an integrated circuit for connecting the computing device (300) to a network (not shown) (e.g., a local area network (LAN), a wide area network (WAN) such as the Internet, mobile network, or any other type of network) and/or to another device, such as another computing device.

In one embodiment of the invention, the computing device (300) may include one or more output devices (308), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (302), non-persistent storage (304), and persistent storage (306). Many diverse types of computing devices exist, and the aforementioned input and output device(s) may take other forms.

One or more embodiments of the invention may be implemented using instructions executed by one or more processors of the cluster manager. Further, such instructions may correspond to computer readable instructions that are stored on one or more non-transitory computer readable mediums.

One or more embodiments of the invention improves upon the traditional method of performing a backup, by having a data protection manager or similar component of the system, determine, when a backup is requested, which backup agent should initially perform the backup. That backup agent may then determine among the other applicable backup agents, which backup types are needed and the order each backup agent performs the backup, when more than one backup agent is appropriate. This will allow for a more efficient backup, while avoiding collisions between two or more backup agents trying to simultaneously back up the same data.

The problems discussed above should be understood as being examples of problems solved by embodiments of the invention disclosed herein and the invention should not be limited to solving the same/similar problems. The disclosed invention is broadly applicable to address a range of problems beyond those discussed herein.

While the invention has been described with respect to a limited number of embodiments, those skilled in the art, having benefit of this disclosure, will appreciate that other embodiments may be devised which do not depart from the scope of the technology as disclosed herein. Accordingly, the scope of the invention should be limited only by the attached claims.

What is claimed is:

1. A method for performing a backup in a cluster environment comprising of a plurality of data nodes, the method comprising:

receiving, by a data protection manager, a request to perform a backup of at least one application;

performing, in response to the request and by a cluster manager managing the cluster environment, discovery on the cluster environment to obtain an asset mapping, wherein the asset mapping specifies a data type of the at least one application, dependency information of the at least one application, and data change rate of the at least one application,
    wherein the asset mapping further specifies a storage location of assets associated with the at least one application,
    wherein the storage location of each of the assets is one of: a local storage of a data node of the plurality of data nodes and a shared volume of the cluster environment;
providing, by the cluster manager, the asset mapping to the data protection manager;
based on the asset mapping, determining whether the application is mapped to a shared volume;
assigning, by the data protection manager, a backup agent as an assigned backup agent for performing the backup of the at least one application, wherein
    if the application is mapped to a shared volume, the data protection manager determines if more than one appropriate backup agents exist for backing up the at least one application and data for the at least one application, and based on the determination, the data protection manager determines one of the more than one appropriate backup agents to serve as the assigned backup agent for performing the backup of the at least one application using the storage location of the assets, and
    if the application is not mapped to a shared volume, the data protection manager assigns an appropriate backup agent as the assigned backup agent for performing the backup of the at least one application and data for the at least one application; and
sending a message from the data protection manager to the assigned backup agent to perform the backup of the at least one application,
wherein the data protection manager uses the dependency information of the at least one application, the data type, and data change rate of the at least one application in the asset mapping to perform a restoration of the backup after performing the backup.

2. The method of claim 1, wherein if the application is mapped to a shared volume, the assigned backup agent determines an order for each of the more than one appropriate backup agents to perform the backup, and each of the more than one appropriate backup agents performs the backup in the determined order after the assigned backup agent receives the message from the data protection manager to perform the backup of the at least one application.

3. The method of claim 2, wherein the determined order specifies that only one backup agent is active at any given time.

4. The method of claim 1, wherein the application is a database application, and the one or more appropriate backup agents includes a database backup agent.

5. The method of claim 1, wherein the application is an electronic mail application, and the one or more appropriate backup agents includes an electronic mail backup agent.

6. The method of claim 1, wherein the one or more appropriate backup agents includes a file system backup agent.

7. The method of claim 6, wherein the data protection manager determines that the file system backup agent is to serve as the assigned backup agent.

8. A system comprising:
a plurality of nodes;
a data protection manager comprising of:
    at least one processor; and
    at least one memory that includes instructions, which when executed by the processor, performs a method for a backup in a cluster environment comprising of the plurality of data nodes, the method comprising:
        receiving, by the data protection manager, a request to perform a backup of at least one application;
            wherein a cluster manager of the cluster environment performs discovery on the cluster environment to obtain an asset mapping and provides the asset mapping to the data protection manager,
            wherein the asset mapping specifies a data type of the at least one application, dependency information of the at least one application, and data change rate of the at least one application,
            wherein the asset mapping further specifies a storage location of assets associated with the at least one application,
            wherein the storage location of each of the assets is one of: a local storage of a data node of the plurality of data nodes and a shared volume of the cluster environment;
        based on the asset mapping, determining whether the backup of the at least one application is mapped to a shared volume;
        assigning, by the data protection manager, a backup agent as an assigned backup agent for performing the backup of the at least one application, wherein
            if the application is mapped to a shared volume, the data protection manager determines if more than one appropriate backup agent exists for backing up the at least one application and data for the at least one application, and based on the determination, the data protection manager determines one of the more than one appropriate backup agents to serve as the assigned backup agent for performing the backup of the at least one application using the storage location of the assets, and
            if the application is not mapped to a shared volume, the data protection manager assigns an appropriate backup agent as the assigned backup agent for performing the backup of the at least one application and data for the at least one application; and
        sending a message from the data protection manager to the assigned backup agent to perform the backup of the at least one application,
        wherein the data protection manager uses the dependency information of the at least one application, the data type, and data change rate of the at least one application in the asset mapping to perform a restoration of the backup after performing the backup.

9. The system of claim 8, wherein if there is more than one appropriate backup agents, the assigned backup agent determines an order for each of the more than one appropriate backup agents to perform the backup, and each of the more than one appropriate backup agents performs the backup in the determined order after the assigned backup agent receives the message from the data protection manager to perform the backup of the at least one application.

10. The system of claim 9, wherein the determined order specifies that only one backup agent is active at any given time.

11. The system of claim 8, wherein the application is a database application, and the one or more appropriate backup agents includes a database backup agent.

12. The system of claim 8, wherein the application is an electronic mail application, and the one or more appropriate backup agents includes an electronic mail backup agent.

13. The system of claim 8, wherein the one or more appropriate backup agents includes a file system backup agent.

14. The system of claim 13, wherein the data protection manager determines that the file system backup agent is to serve as the assigned backup agent.

15. A non-transitory computer readable medium comprising computer readable program code, which when executed by a computer processor enables the computer processor to perform a method for performing a backup in a cluster environment comprising of the plurality of data nodes, the method comprising:
   receiving a request to perform a backup of at least one application;
   performing, in response to the request and by a cluster manager managing the cluster environment, discovery on the cluster environment to obtain an asset mapping,
      wherein the asset mapping specifies a data type of the application, dependency information, and data change rates,
      wherein the asset mapping further specifies a storage location of assets associated with the at least one application,
      wherein the storage location of each of the assets is one of: a local storage of a data node of the plurality of data nodes and a shared volume of the cluster environment;
   providing, by the cluster manager, the asset mapping to the data protection manager;
   based on the asset mapping, determining whether the backup of the at least one application is mapped to a shared volume;
   assigning a backup agent as an assigned backup agent for performing the backup of the at least one application, wherein
      if the application is mapped to a shared volume, then if more than one appropriate backup agents exist for backing up the at least one application and data for the at least one application, and based on the determination, the data protection manager determines one of the more than one appropriate backup agents to serve as the assigned backup agent for performing the backup of the at least one application using the storage location of the assets, and
      if the application is not mapped to a shared volume, an appropriate backup agent as the assigned backup agent for performing the backup of the at least one application and data for the at least one application; and
   sending a message to the assigned backup agent to perform the backup of the at least one application,
      wherein the data protection manager uses the dependency information of the at least one application, the data type, and data change rate of the at least one application in the asset mapping to perform a restoration of the backup after performing the backup.

16. The non-transitory computer readable medium of claim 15, wherein if the application is mapped to a shared volume, the assigned backup agent determines an order for each of the more than one appropriate backup agents to perform the backup, and each of the more than one appropriate backup agents performs the backup in the determined order after the assigned backup agent receives the message from the data protection manager to perform the backup of the at least one application.

17. The non-transitory computer readable medium of claim 16, wherein the determined order specifies that only one backup agent is active at any given time.

18. The non-transitory computer readable medium of claim 15, wherein the application is a database application, and the one or more appropriate backup agents includes a database backup agent.

19. The non-transitory computer readable medium of claim 15, wherein the one or more appropriate backup agents includes a file system backup agent.

20. The non-transitory computer readable medium of claim 19, wherein the data protection manager determines that the file system backup agent is to serve as the assigned backup agent.

* * * * *